March 7, 1939.    O. SCHARPF    2,149,792
TEMPERATURE CONTROL
Filed Sept. 1, 1938
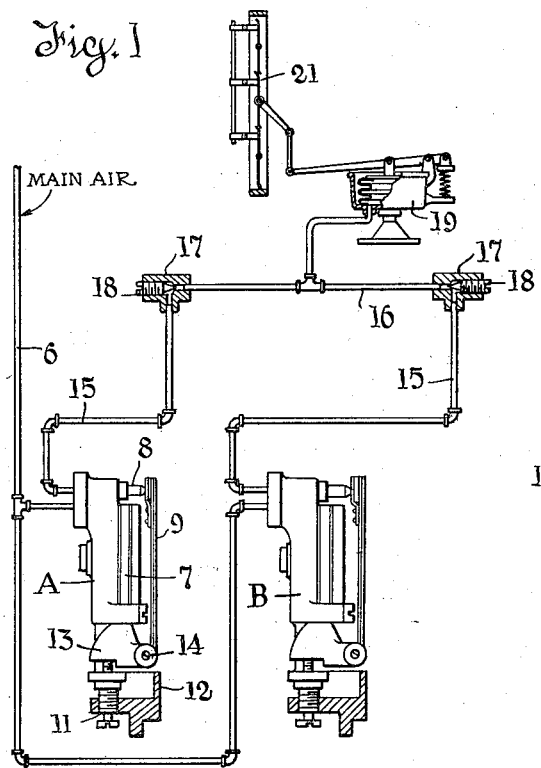
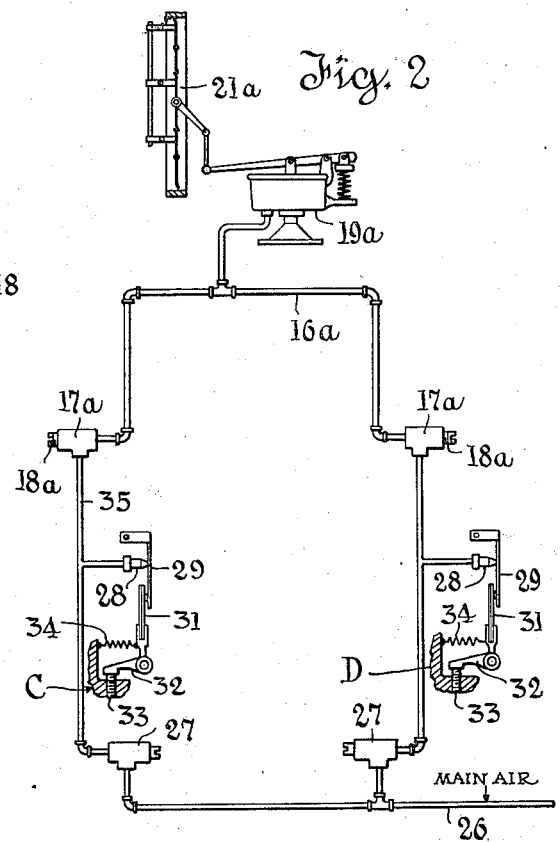
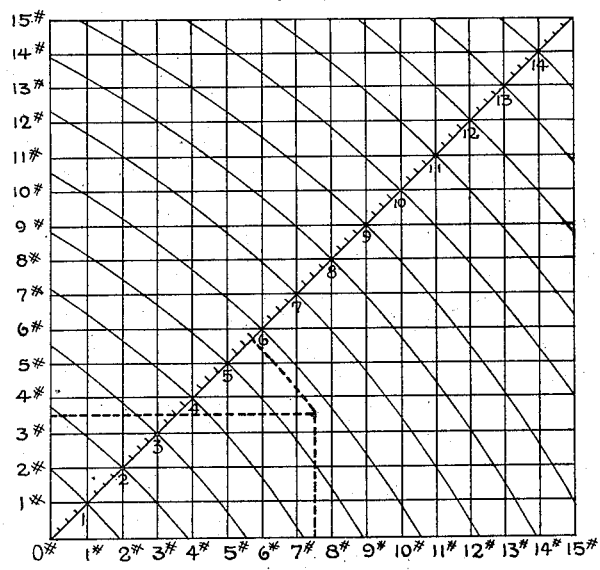
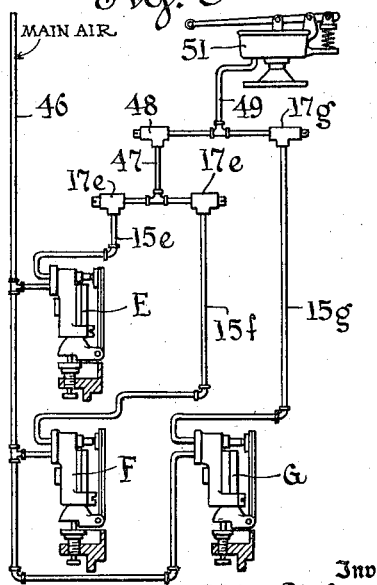
Inventor
Otto Scharpf
Attorneys Patented Mar. 7, 1939

2,149,792

UNITED STATES PATENT OFFICE 2,149,792

TEMPERATURE CONTROL

Otto Scharpf, Milwaukee, Wis., assignor to Johnson Service Company, Milwaukee, Wis., a corporation of Wisconsin Application September 1, 1938, Serial No. 228,031

3 Claims. (Cl. 236—79)

This invention relates to the regulation of temperature and humidity and particularly to pneumatic systems of control.

Where temperature or humidity or both are controlled in large enclosures it is frequently necessary to regulate a single central plant or device according to the average of the simultaneous indications of a plurality of instruments located at different points in such enclosure.

In using pneumatic thermostats or hygrostats of the progressive type (such as shown in the patent to Otto, 1,500,260, July 8, 1924), it has been the usual practice to lead the branch lines of all these instruments to an averaging device sometimes called a "cumulator." The function of the cumulator, which is a sort of multiple relay, was to respond to all the branch pressures in such a way as to develop a secondary pressure varying as the average of the instantaneous values of the branch line pressures. This secondary pressure was used to control the plant.

The simplest known averaging cumulator is expensive, and requires considerable maintenance service.

The present invention permits the attainment of approximately the same result eliminating the cumulator and substituting simple flow restricting orifices or chokes. This possibility arises from the fact that a leak port instrument, whether or not it includes a relay, regulates by modulating admission and exhaust functions affecting the pressure in its branch line. The chokes being of equal flow capacity ensure that all the thermostats participate equally in establishing an approximately average pressure beyond the chokes, and this approximately average pressure is used to regulate the plant.

The above principle is capable of embodiment in a number of different ways and will now be discussed in connection with the accompanying drawing, in which—

Fig. 1 shows in diagram a scheme for averaging the branch line pressures of two progressive relay thermostats. The same idea can be elaborated using a larger number of thermostats.

Fig. 2 is a diagram showing a similar arrangement in which leak port thermostats, not including relays, are substituted.

Fig. 3 is a view similar to Fig. 1 showing three relay thermostats, so arranged that the branch line pressures of two thermostats are averaged and this average is averaged with the branch line pressure of the third thermostat.

Fig. 4 is a diagram in which the results secured with the arrangement of Fig. 1 are plotted, and by means of which the performance of such a system can be predicted over its entire range.

Referring first to Fig. 1, 6 represents the air supply line which supplies air conveniently at 15 pounds gage pressure to the pneumatic thermostats. Each thermostat, which conveniently may be (and is indicated as) constructed in accordance with the patent to Otto, 1,500,260, above identified, includes a pressure operated relay 7 controlled by a leak port 8 which is variably throttled by a bi-metallic thermostatic bar 9. 11 represents an adjusting screw with indicating dial 12, the screw changing the position of the weighted saddle 13 which is pivoted at 14 and upon which the thermostatic bar 9 is mounted. The relay 7 controls the pressure in the branch line 15 and comprises a pressure motor subject on one side to the back pressure developed by throttling the leak port 8, subject on the other side to the pressure in the branch line 15, and arranged to actuate a selective admission and exhaust valve to admit pressure from the main 6 to the branch line 15, or to close such admission and vent the branch line more or less.

As stated, Fig. 1 shows two such thermostats indicated generally by the letters A and B, the two thermostats being identical. Branch lines 15 of the two thermostats communicate with an averaging line 16 through restrictions generally indicated at 17, and each including a needle valve 18 which by rendering the restrictions adjustable, permit them to be set for identical flow capacities. Absolute identity probably is not essential, but a close approximation is important.

The averaging line 16 affords a connection to a single bellows motor 19, typical of any pressure motor, shown connected to operate a louver damper 21, typical of any control mechanism or system.

In Fig. 4, the ordinates represent the branch pressures delivered by one thermostat, say A, and the abscissae represent the branch pressures delivered by the other thermostat, say B. The arcuate lines read against the graduated diagonal line give the average pressure secured. This plot is based on actual test data.

Suppose the thermostat A develops a pressure of 3½ pounds and the thermostat B a branch line pressure of 7½ pounds. The actual average of these two would be 5½ pounds. The approximate average pressure secured by the embodiment of Fig. 1 can be determined from Fig. 4 as follows. A horizontal line is drawn through 3½ pounds on the ordinate scale and a vertical line from 7½ pounds on the abscissa scale. From their point of intersection, a curved line conforming to the curvature of the adjacent arcuate line on the plot is drawn to intersect in the graduated diagonal. The intercept in the diagonal is the pressure in the averaging line 16. In the example drawn on the diagram, this is not quite 5¾ pounds gage. This example is given to indicate that the approximation is close though the averaging effect is not absolutely precise.

The relays of the thermostats A and B respond in part to pressures in the branch lines, and they have both admission and exhaust functions. Upon this factor and the stabilizing effect of the restriction depends the desired averaging result. However, the use of the relays is not strictly necessary. Leak port thermostats devoid of any relays may be used as indicated in Fig. 2.

In this figure 26 represents the main air line. 27 represents a supply restriction having a capacity greater than the maximum capacity of the leak port 28. Leak port 26 is variably throttled by a valve 29 which is operated by a thermostat 31. This is mounted on a pivoted saddle 32 with adjusting screw 33, and is held against the adjusting screw by a tension spring 34. Thus the opening and closing of the leak port 28 by the valve 29 varies the pressure in the line 35. The parts 27 to 35 make up one thermostat C and the similarly numbered parts to the right make up the second thermostat D. The two thermostats C and D are connected by corresponding restricting orifices 17a with the averaging line 16a which is identical with that of Fig. 1.

Since the restricted orifice 27 controls supply and the leak port 28 and lid 29 control exhaust, the predominance of supply or exhaust flow depends on the degree to which the leak port 28 is throttled. Consequently, there is a supply and exhaust control exercised by each thermostat C and D and this, together with the stabilizing effect of the restrictions 17a, gives the necessary averaging effect.

There is one detail in which the action of the embodiment of Fig. 2 departs slightly from the action of the structure in Fig. 1. Suppose thermostat C is trying to increase the pressure in pipe 16a and the thermostat D is seeking to decrease the pressure in that pipe, there would be flow from 16a through the restriction 17a, slightly augmenting the supply of air to be handled by the leak port 28 of thermostat D. This would slightly change the control point of that instrument. However, the effect is negligible particularly in the mid-range of the two instruments, that is, where the divergence of their indications is not great. Tests show the arrangement of Fig. 2 will give reasonably precise results.

Fig. 3 shows an alternative arrangement which can be used in certain cases. In this case 46 represents the main line supplying air to three thermostats identical with those shown in Fig. 1, and generally indicated by the letters E, F and G. Thermostat E has a branch line 15e and the thermostat F has a branch line 15f. The pressure in the two pipes 15e and 15f are averaged by the restrictions 17e and 17f leading to an averaging pipe 47. Thermostat G has a branch line 15g and the pressures in the averaging pipe 47 and the branch line 15g are averaged by restrictions 17g and 48, so that the averaging pipe 49 connected with motor 51 gives an approximate average as to the indications of the three thermostats E, F and G.

There are conditions where arrangements of this sort are preferred, but the results are not quite so accurate as those secured by connecting all the branch pipes to a single averaging pipe through controlling restrictions. However, Fig. 3 shows another way in which the general principle of the invention may be availed of to secure commercially satisfactory results.

It should be understood of course, that the arrangement shown in Fig. 2, although it involves only two thermostats, is typical of the arrangements using two or more.

Three possible embodiments of the inventive principle have been illustrated and many more are possible within the scope of the invention. Accordingly, the description above given is to be taken as illustrative and not limiting.

What is claimed is:

1. The combination of a fluid pressure supply line; a plurality of gradual acting relays connected therewith and each having a branch line in which it controls pressure and a variable leak port arranged to control the relay; responsive elements, one controlling each leak port; a motor adapted to regulate an atmospheric condition; and restricted communications of substantially identical flow capacity between the various branch lines and said motor.

2. A mechanism for controlling atmospheric conditions substantially according to the average of at least two variable values, comprising in combination, a supply of pressure fluid; a plurality of control devices of the leak port type, one for each variable value and responsive thereto, and each comprising an inlet orifice fed by the supply, a discharge orifice, and means responsive to the corresponding variable value to throttle one of said orifices proportionally, the device being so arranged that a controlled pressure is established by a variable admission and exhaust effect; motor means for regulating an atmospheric condition arranged to be actuated by variations of fluid pressure; and means affording a plurality of restricted orifices of substantially identical flow capacity, one for each control device and serving to communicate its controlled pressure to said motor means.

3. A mechanism for controlling atmospheric conditions substantially according to the average of at least two variable values, comprising in combination, a supply of pressure fluid; a plurality of control devices of the leak port controlled progressive relay type, one for each variable value and responsive thereto, and each comprising a pressure motor, an inlet and exhaust valve device operated thereby; a branch line to which the valve device admits pressure fluid from the source and from which it exhausts pressure fluid, a supply and a discharge orifice leading to and from said motor and means responsive to the variable value to throttle one of said two orifices proportionally; motor means for regulating an atmospheric condition, arranged to be actuated by variations of fluid pressure; and means affording a plurality of restricted orifices of substantially identical flow capacity, one connecting each branch line with said motor means.

OTTO SCHARPF.